US010515033B2

(12) United States Patent
Kakio et al.

(10) Patent No.: US 10,515,033 B2
(45) Date of Patent: Dec. 24, 2019

(54) DEVICE MANAGEMENT SYSTEM, DEVICE MANAGER, RELAY MANAGEMENT DEVICE, DEVICE MANAGEMENT METHOD, AND RECORDING MEDIUM

(71) Applicant: SEIKO EPSON CORPORATION, Tokyo (JP)

(72) Inventors: Ryosuke Kakio, Nagano (JP); Masato Iguchi, Nagano (JP); Toshie Imai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/140,969

(22) Filed: Sep. 25, 2018

(65) Prior Publication Data
US 2019/0095367 A1    Mar. 28, 2019

(30) Foreign Application Priority Data

Sep. 27, 2017    (JP) ................................. 2017-185802
May 16, 2018    (JP) ................................. 2018-094794

(51) Int. Cl.
   *G06F 13/20*        (2006.01)
   *H04N 1/00*        (2006.01)
               (Continued)

(52) U.S. Cl.
   CPC ............. *G06F 13/20* (2013.01); *H04B 7/14* (2013.01); *H04L 41/0213* (2013.01); *H04N 1/00217* (2013.01)

(58) Field of Classification Search
None
See application file for complete search history.

(56) References Cited

U.S. PATENT DOCUMENTS 5,295,244 A * 3/1994 Dev ..................... G06F 11/2257
                                                 709/223
6,052,728 A * 4/2000 Fujiyama ................ H04L 41/00
                                                 709/224

(Continued)

FOREIGN PATENT DOCUMENTS

JP        2005-128890 A    5/2005

OTHER PUBLICATIONS

The Extended European Search Report for the corresponding European Patent Application No. 18197105.2 dated Jan. 29, 2019.

*Primary Examiner* — Henry Tsai
*Assistant Examiner* — Aurangzeb Hassan
(74) *Attorney, Agent, or Firm* — Global IP Counselors, LLP

(57) ABSTRACT

Provided is technology simplifying managing locally connected devices. A device management system configured to connect through a network a device manager and a relay manager that connects to multiple devices through a local communication path. The device manager sends to the relay manager through the network a first process request, the first process request conforming to SNMP, and containing device identification information identifying a device that connects to the relay manager. The relay manager acquires from the first process request target identification information identifying management information to process in the management information of a device, generate a second process request containing the target identification information, and send the second process request through the local communication path indicated by the device identification information contained in the first process request.

10 Claims, 7 Drawing Sheets

(51) Int. Cl.
*H04L 12/24* (2006.01)
*H04B 7/14* (2006.01)

(56) References Cited

U.S. PATENT DOCUMENTS

| | | | | |
|---|---|---|---|---|
| 7,254,781 | B1* | 8/2007 | Land | H04L 12/2856 |
| | | | | 715/760 |
| 9,094,299 | B1* | 7/2015 | Rao D.S. | H04L 41/0813 |
| 2005/0111856 | A1 | 5/2005 | Kawai | |
| 2007/0067428 | A1* | 3/2007 | Ogawa | H04L 47/821 |
| | | | | 709/223 |
| 2007/0268896 | A1* | 11/2007 | Oyama | H04L 29/06027 |
| | | | | 370/389 |
| 2007/0288512 | A1* | 12/2007 | Matsubara | G06F 9/5055 |
| 2007/0294228 | A1* | 12/2007 | Kawana | H04L 41/28 |
| 2008/0021991 | A1 | 1/2008 | Kawai | |
| 2010/0274845 | A1* | 10/2010 | Hikichi | H04N 21/2393 |
| | | | | 709/203 |
| 2012/0311566 | A1* | 12/2012 | Takaoka | H04L 41/5035 |
| | | | | 718/1 |
| 2013/0117766 | A1* | 5/2013 | Bax | G06F 9/4405 |
| | | | | 719/323 |
| 2016/0226953 | A1* | 8/2016 | Ishino | H04L 67/10 |
| 2016/0315852 | A1* | 10/2016 | Tanabe | H04L 45/32 |
| 2016/0350039 | A1 | 12/2016 | Yamaguchi | |

* cited by examiner

DEVICE MANAGEMENT SYSTEM, DEVICE MANAGER, RELAY MANAGEMENT DEVICE, DEVICE MANAGEMENT METHOD, AND RECORDING MEDIUM

BACKGROUND

1. Technical Field

The present invention relates to a device management system, a device manager, a relay management device, a device management method, and a recording medium.

2. Related Art

JP-A-2005-128890 describes a system having a manager PC and a managed PC connected over a network with a printer connected locally to the managed PC, and configured so that the managed PC acquires printer information from the printer, and the manager PC acquires the printer information from the managed PC. A network printer is also connected to the network described in JP-A-2005-128890 without going through the managed PC.

However, managing the network printer connected to the network without going through a managed PC, and managing the printer connected to the managed PC through a local connection, are controlled differently (communication is controlled using different communication protocols and commands). As a result, acquiring information from a locally connected device using a network management protocol, and device management such as configuring settings of a locally connected device, is not possible from a device manager connected to the network.

SUMMARY

The present invention provides a device management system, a device manager, a relay management device, a device management method, a device management program, and a relay management program that usefully address the problem described above.

One aspect of the invention is a device management system configured to connect, through a network, a device manager that manages a device, and a relay manager that connects to multiple devices through a local communication path; the device manager including a first network communicator configured to send to the relay manager through the network a first process request, the first process request conforming to a specific network communication protocol used to manage management targets that connect to the network, and containing device identification information identifying a device that connects to the relay manager; and the relay manager including a second network communicator configured to receive the first process request through the network, a generator configured to acquire, from the first process request, target identification information identifying management information to process in the management information of the device, and generate a second process request containing the target identification information, and a local communicator configured to send the second process request through the local communication path to the device indicated by the device identification information contained in the first process request.

DESCRIPTION OF EMBODIMENTS

Preferred embodiments of the present invention are described below with reference to the accompanying figures. Note that the accompanying figures are shown for example only.

1. System Summary

Figure 1:
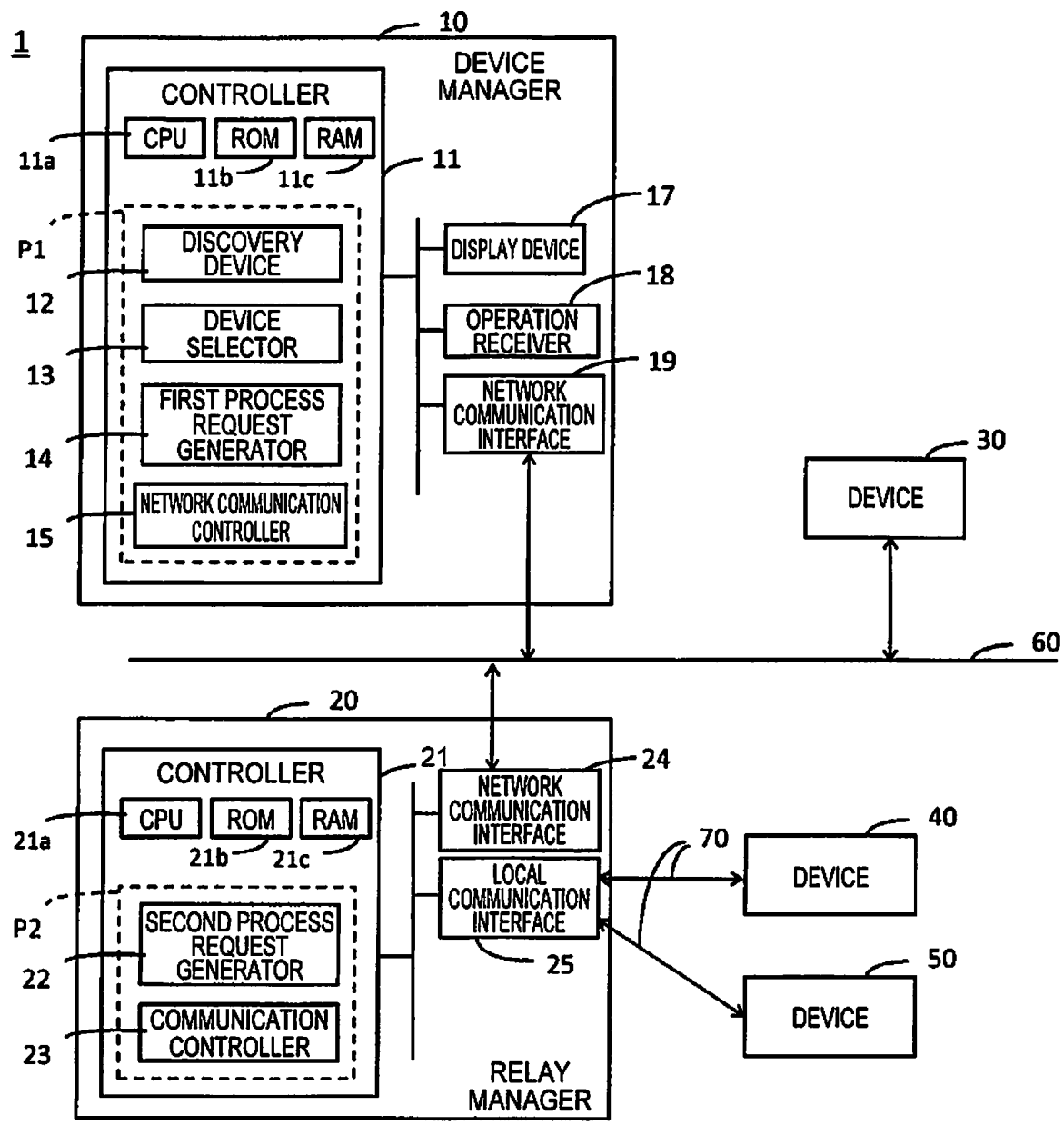
FIG. 1 schematically illustrates a system configuration.

FIG. 1 schematically illustrates the configuration of a system 1 according to a preferred embodiment of the invention. At least part of this system 1 corresponds to a device management system. This system 1 includes a device manager 10 and a relay manager 20. The device manager 10 and relay manager 20 are each embodied in this example by a personal computer (PC) or other information processing device having processing capacity comparable to a PC. The hardware capable of embodying controller 11 according to this embodiment may be referred to as a device manager, and the hardware capable of embodying controller 21 according to this embodiment may be referred to as a relay manager.

The device manager 10 and relay manager 20 are connected to a network 60, and can communicate with external devices through the network 60. The network 60 may be a local area network (LAN) or the Internet, for example.

Devices 30, 40, 50 are multiple devices that become management targets of the device manager 10. The devices 30, 40, 50 may be, for example, a printer, a scanner, or a multifunction device including both printer and scanner functions.

In the example in FIG. 1, device 30 is connected to the network 60. As a result, the device 30 is an example of a network device managed by the device manager 10.

Devices 40, 50 are locally connected to the relay manager 20 through a local communication connection 70. The local communication connection 70 in this example is a USB cable compatible with the USB (Universal Serial Bus) standard. These devices 40, 50 are also known as locally connected devices or local devices. However, the devices 40, 50 are called locally connected devices because they are connected to the relay manager 20 through a local communication connection 70, but if like device 30 they are connected to the network 60, they also function as network devices like the device 30.

It will be obvious that the number of networks and locally connected devices need not be limited to the number shown in FIG. 1. The number of relay managers 20 recognized by the device manager 10 is also not limited to one. To differentiate between locally connected devices and network devices, locally connected devices may be referred to herein as first devices, and network devices as second devices.

The device manager 10 has, for example, a controller 11, display device 17, operation receiver 18, and network communication interface 19.

The controller 11 is desirably configured with one or more IC devices such as a CPU 11*a*, ROM 11*b*, RAM 11*c*, and storage such as other memory devices or hard disk drives. The controller 11 controls the behavior of the device manager 10 by the CPU 11*a* executing processes according to a program stored in ROM 11*b* and using RAM 11*c* as working memory, for example. The controller 11 has a program P1, and embodies the functions of a discovery device 12, device selector 13, first process request generator 14, and network communication controller 15 according to the program P1. The program P1 may be referred to as a device manager program that causes a computer (such as CPU 11*a*) to execute a process managing devices through the network 60.

The network communication interface 19 is a general term for an interface enabling the controller 11 to communicate over the network 60 with external devices according to a specific communication protocol (such as (TCP/IP (Transmission Control Protocol/Internet Protocol), or UDP (User Datagram Protocol)).

The display device 17 is a means of presenting information visually, such as a LCD device or OLED device. The display device 17 may be configured with a display and a drive circuit for driving the display.

The operation receiver 18 is a means of receiving user operations, and may be embodied by physical buttons, a touch panel, a mouse, or a keyboard. A touch panel may be embodied as a function of the display device 17. The display device 17 and operation receiver 18 together may be referred to as an operating panel.

The relay manager 20 includes a controller 21, network communication interface 24, and local communication interface 25.

The controller 21 is desirably configured with one or more IC devices such as a CPU 21*a*, ROM 21*b*, RAM 21*c*, and storage such as other memory devices or hard disk drives. The controller 21 controls the behavior of the relay manager 20 by the CPU 21*a* executing processes according to a program stored in ROM 21*b* and using RAM 21*c* as working memory, for example. The controller 21 has a program P2, and embodies the functions of a second process request generator 22, and communication controller 23 according to the program P2. The program P2 may be referred to as a relay manager program that causes a computer (such as CPU 21*a*) connected to multiple devices through the local communication connection 70 to execute a process relaying communications for managing devices.

The network communication interface 24 is a general term for an interface enabling the controller 21 to communicate over the network 60 with external devices according to a specific communication protocol similarly to the network communication interface 19.

The local communication interface 25 is an interface for locally connecting one or more devices to the relay manager 20, and if the local communication connection 70 is a USB cable as described above, the local communication interface 25 includes a USB port for connecting the cable. It will be obvious that the relay manager 20, like the device manager 10, may have an operating panel.

The communication controller 23 is configured to manage, using a connection number N, the multiple local communication connections 70 through which the locally connected devices are connected. The connection number N is a specific number (such as N=0) sequentially assigned to the multiple local communication connections 70 to which the locally connected devices connect, and is a specific example of a connection identification information.

The device manager 10 manages the management targets through a specific network management protocol for management targets connected to the network 60. The specific network management protocol is SNMP (Simple Network Management Protocol). The following description is therefore premised on the devices 30, 40, 50 being SNMP-compatible devices. Management of management targets (devices) through SNMP refers to a process of an SNMP manager requesting and acquiring from an SNMP agent information related to the target (management information), and a process of the SNMP manager requesting and causing the SNMP agent to change a setting in the management information.

A managed device (target) stores a database, called a MIB (Management Information Base), of management information related to the target. In the relationship between the device manager 10 and device 30 (network device) connected over the network 60, the device manager 10 (program P1) is the SNMP manager, and the application that resides on the device 30 (network device) is the SNMP agent. In response to a process request by SNMP from the device manager 10, the SNMP agent acquires and returns to the device manager 10 information from the MIB of the device 30 (network device), or writes information to the MIB. In other words, a first network communicator of the device manager 10 sends a process request by SNMP through the network 60 to the network device, and receives through the network 60 a response to the process request from the network device.

Managing and monitoring network devices such as device 30 by the SNMP manager is a common process using SNMP. In addition, the device manager 10 in this embodiment of the invention treats the relay manager 20 (program P2) that is locally connected to devices 40, 50 and is also connected to the network 60 as a type of SNMP agent, and manages the locally connected devices (devices 40, 50) by SNMP communication through the relay manager 20.

2. Device Discovery Process

Figure 2:
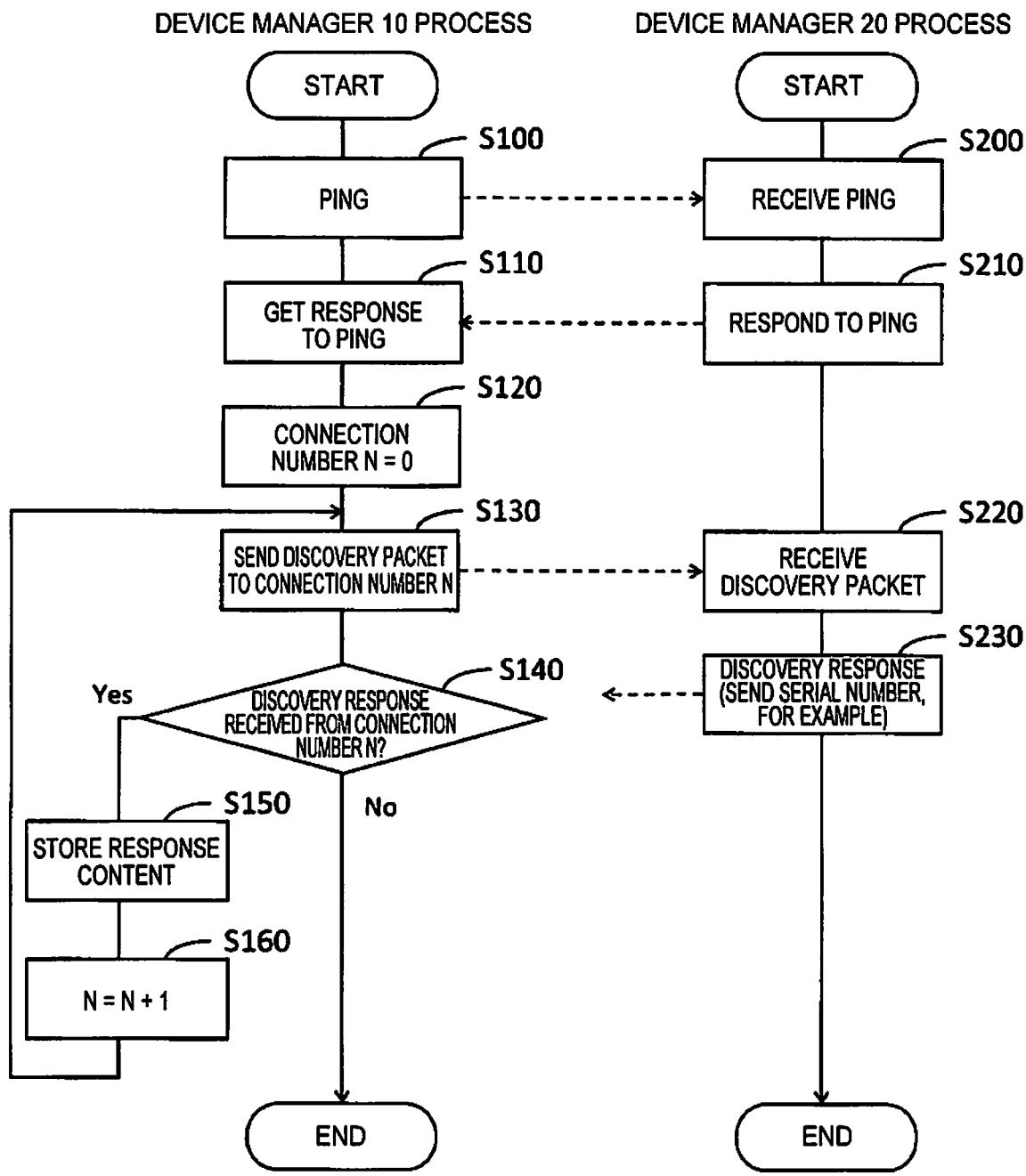
FIG. 2 is a flow chart of a device discovery process.

FIG. 2 is a flow chart of the device discovery process executed by the device manager 10 before device management. FIG. 2 shows the process on the device manager 10 side and the process on the relay manager 20 side together.

First, on the device manager 10 side, the controller 11 (discovery device 12) specifies the relay manager 20 as the destination and pings the relay manager 20 (step S100). In other words, the discovery device 12 sends a specific echo command (ping) from the network communication interface 19 to a previously acquired destination (such as the IP address of the relay manager 20).

On the relay manager 20 side, when the controller 21 is pinged by the device manager 10 through the network communication interface 24 (step S200), the controller 21 responds to the ping (step S210). In other words, the controller 21 sends the received ping through the network communication interface 24 to the device manager 10 that sent the ping.

On the device manager 10 side, the discovery device 12 receives the response from the relay manager 20 to the ping sent in step S100 (step S110). When a response to the ping is received, the discovery device 12 confirms that communication is possible through the relay manager 20 and network 60, and goes to step S120. If a response from the relay manager 20 to the ping sent in step S100 is not received (due, for example, to a timeout), the discovery device 12 ends the process in FIG. 2 without continuing from step S120. Below in the description referring to FIG. 2, a relay manager 20 confirmed by steps S100 and S110 to be able to communicate through the network 60 is called a target relay manager 20.

In step S120, the discovery device 12 initializes the number (connection number N) used when discovering devices connected locally to the target relay manager 20 to connection number N=0.

In step S130, the discovery device 12 sends a specific discovery packet to discover a device of connection number N from the network communication interface 19 to the target relay manager 20.

A discovery packet is a command requesting basic device information (basic device information such as the serial number, model name, compatible version of SNMP, other identification information such as the MAC address or IP address). The serial number of a device is abbreviated as SN in the figures.

When a discovery packet sent from the device manager 10 is received through the network communication interface 24 on the relay manager 20 side (step S220), the controller 21 responds to the received discovery packet (sends a discovery response) (step S230). Specifically, when a discovery packet is received, the controller 21 sends basic device information related to one of the devices recognized through the local communication interface 25 (such as devices 40, 50) that has not already sent basic device information in response to a discovery packet through the network communication interface 24 to the device manager 10 as the response to the discovery packet received in step S220. In other words, of the local communication connections 70 connected to the local communication interface 25, the controller 21 sends, in step S230 as the response to the discovery packet, basic device information for the device locally connected to the local communication connection 70 identified by the connection number N specified by the discovery packet received in step S220.

As will be understood from FIG. 2, each time step S130 is repeated, step S220, S230 are executed on the target relay manager 20 side. Note that if there is no locally connected device that has not sent basic device information in response to the discovery packet when the discovery packet is received in step S220, the controller 21 does not execute a discovery response (step S230), or sends a specific error report as the discovery response (S230).

On the device manager 10 side, after sending a discovery packet of connection number N in step S130 to the target relay manager 20, the discovery device 12 continuously determines whether or not a response to the discovery packet of connection number N (a normal response, not an error report) was received through the network communication interface 19 (step S140).

If a normal response to the discovery packet of connection number N is received within a specific time after step S130 (that is, if a timeout does not occur) (step S140: Yes), control goes to step S150.

If, after sending a discovery packet of connection number N in step S130 to the target relay manager 20, an error report is received from the target relay manager 20, or a response to the discovery packet of connection number N (a normal response, not an error report) is not received before a timeout occurs (step S140: No), the discovery device 12 ends the process in FIG. 2.

In step S150, the discovery device 12 stores the content of the response to the discovery packet of connection number N determined received in step S140. That is, the basic device information of one device connected locally to the target relay manager 20 is relationally stored to the target relay manager 20 in specific storage (of the controller 11, such as RAM 11c, other memory device, or hard disk drive). In step S160 after step S150, the discovery device 12 adds one to the current connection number N, and then returns to step S130.

Through the discovery process described above, the relay manager 20 identifies multiple local communication connections 70 based on the connection identification information. The device manager 10 sends a request including connection identification information, that is, a discovery packet, through the network 60 to the relay manager 20, and receives through the network 60 from the relay manager 20 basic device information about the device connected to the local communication connection 70 corresponding to the specified connection identification information. As a result, the device manager 10 can acquire and store basic device information, such as the serial number, of each device (such as devices 40, 50) connected locally to a relay manager 20 that can communicate through the network 60.

If multiple relay managers 20 are connected to the network 60, the device manager 10 executes the discovery process for each relay manager 20, and acquires basic device information for each device connected locally to each relay manager 20.

Separately from the discovery process shown in FIG. 2, the device manager 10 can also broadcast an SNMP discovery packet over the network 60, receive a response from any network device that received the broadcast discovery packet, and thereby acquire and store basic device information for each network device (such as device 30) connected to the network 60.

3. Device Management Process

Figure 3:
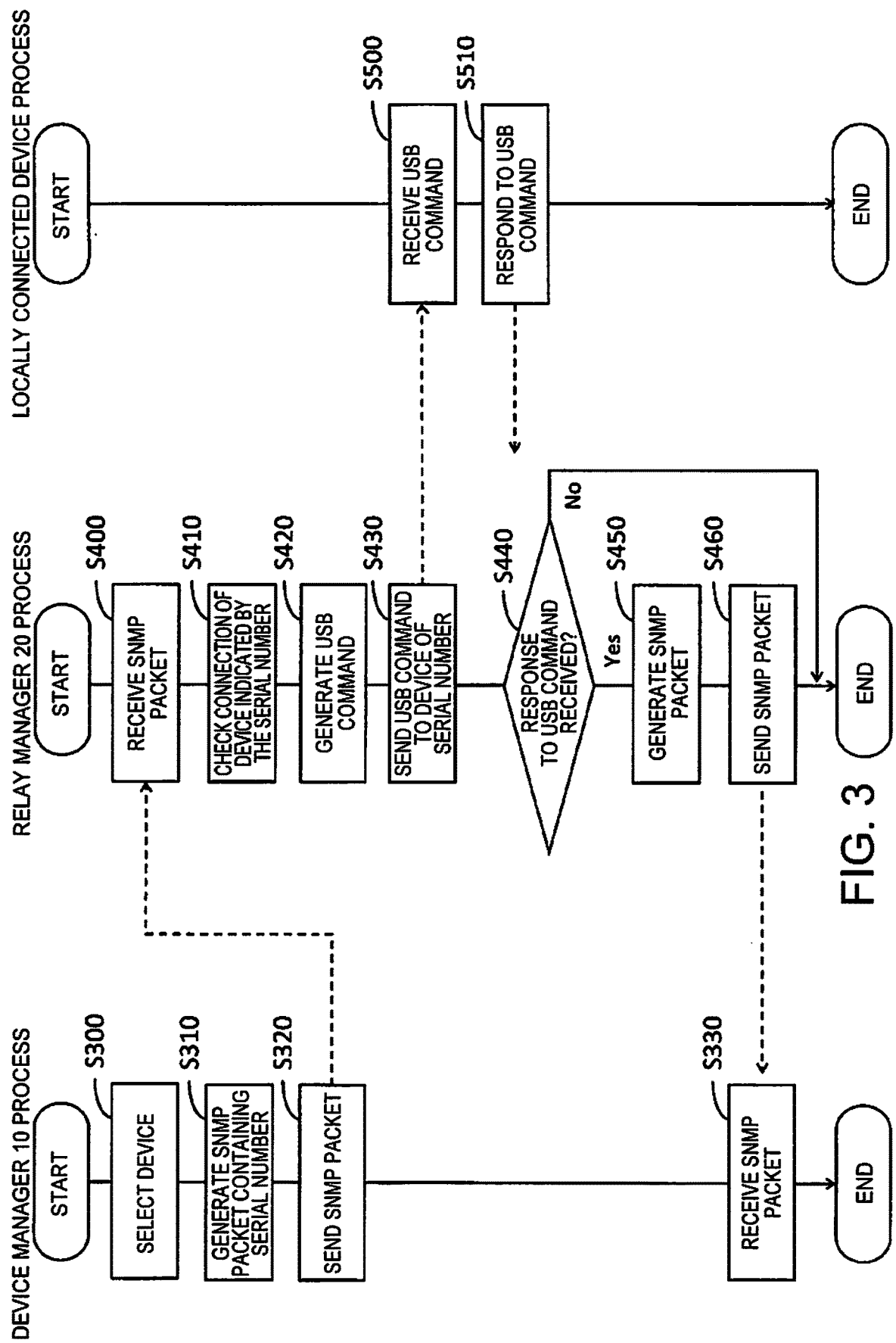
FIG. 3 is a flow chart of a device management process (device management method).

FIG. 3 is a flow chart of the device management process. FIG. 3 shows the processes executed by the device manager 10, the relay manager 20, and a device with a local connection to the relay manager 20 (a locally connected device).

On the device manager 10 side, the controller 11 (device selector 13) selects a device as the target of the management process from among the devices for which basic device information is already stored (step S300). Various methods may be used to select the device. For example, at a specific time interval the device selector 13 may automatically select the devices for which basic device information is already stored one at a time as the target.

Alternatively, the device selector 13 may select a device in response to a user operation. In this case, the device selector 13 displays a device list on the display device 17 based on the basic device information of each device stored by the device manager 10. The device list presents a list of devices that can be targets of the management process by, for example, arraying information such as the name of the model or identification information (serial number, MAC address, IP address) of each device in a list or table. The user can then select the desired device from the device list presented on the display device 17 by operating the operation receiver 18. The device selector 13 then selects the device in response to the user operation (receives the device selection of the user).

In step S310, the controller 11 (first process request generator 14) generates a communication packet (SNMP packet) including the serial number of the device selected in step S300 (referred to below as the selected device). The serial number is an example of device identification information identifying a particular device. The SNMP packet generated in step S310 is an example of a first process request in a specific network communication protocol (SNMP), and a first process request including device identification information identifying a device that connects the relay manager 20.

In step S320, the controller 11 (network communication controller 15) sends the SNMP packet generated in step S310 from the network communication interface 19 to the relay manager 20 locally connected to the selected device (first process request transmission step). The network communication interface 19 is an example of a first network communicator.

On the relay manager 20 side, the controller 21 (communication controller 23) receives through the network communication interface 24 the SNMP packet sent from the device manager 10 as described above (step S400, first process request reception step). The network communication interface 24 is an example of a second network communicator.

In step S410, the controller 21 checks if it (the relay manager 20) can currently communicate with the device identified by the serial number contained in the SNMP packet received in step S400 (the selected device) through the local communication interface 25, and then goes to step S420. If the device identified by the serial number contained in the SNMP packet received in step S400 (the selected device) is not currently communicatively connected through the local communication interface 25, the controller 21 quits the process in FIG. 3 without proceeding from step S420. In this event, step S460 described below (sending an SNMP packet from the relay manager 20 to the device manager 10) is not executed.

In step S420, the controller 21 (second process request generator 22), based on the SNMP packet received in step S400, generates a USB command as a process request (second process request) to the selected device (second process request generating step).

Figure 4:
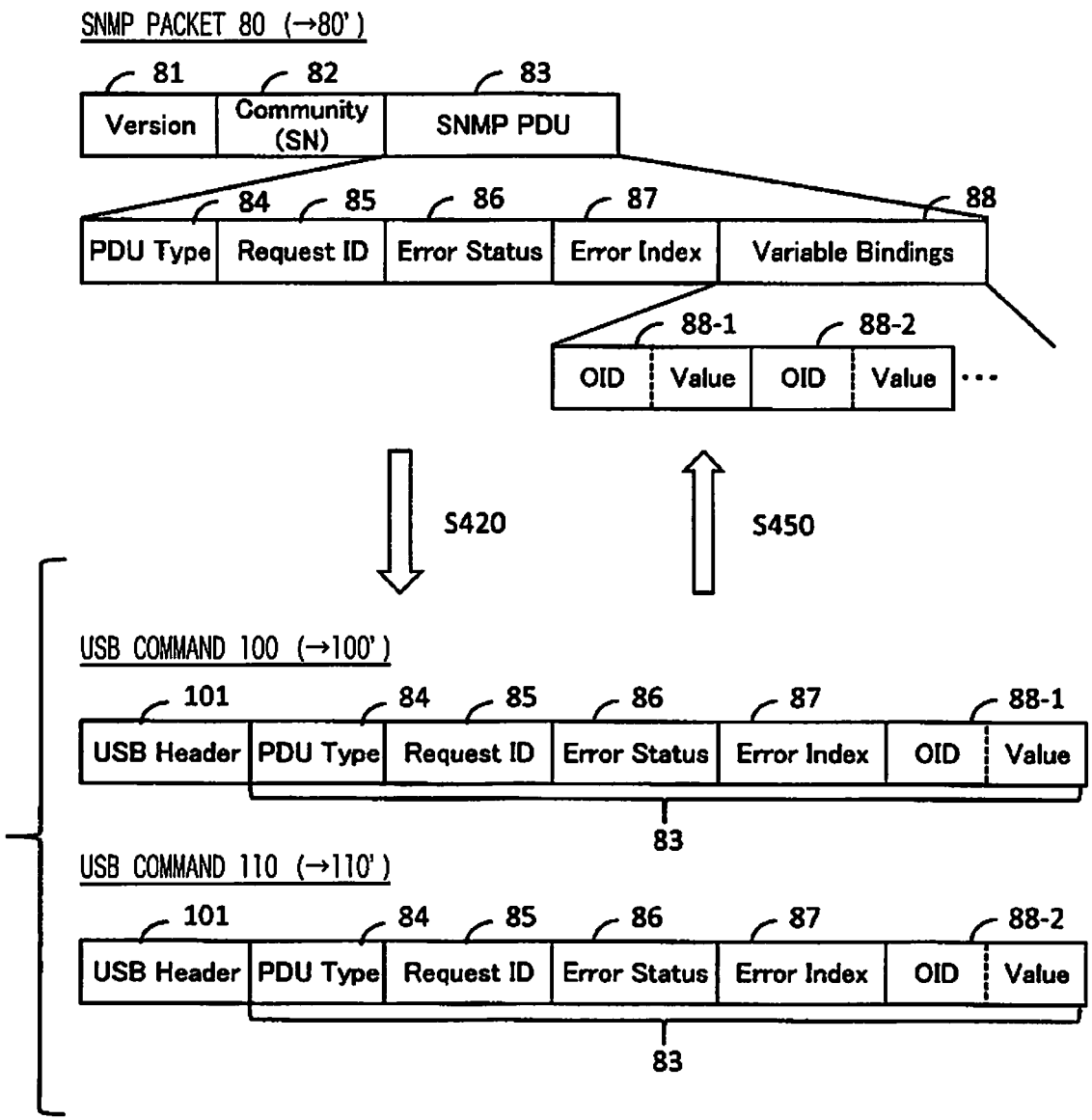
FIG. 4 shows the structure of an SNMP packet and USB command according to a first embodiment of the invention.

FIG. 4 illustrates the structure of an SNMP packet and USB command.

The content shown in FIG. 4 is also referred to as a first embodiment of the invention.

The SNMP packet 80 is the SNMP packet sent in step S320 from the device manager 10 to the relay manager 20 through the network 60, and in this example is a packet in a format compatible with SNMP versions SNMPv1 and SNMPv2. SNMP packet 80 has a version field 81 where the version of SNMP the SNMP packet 80 is compatible with is stored; a community field 82 where the community name used to limit access to the MIB is stored; and a data field (SNMP PDU (Protocol Data Unit)) 83.

More specifically, the data field 83 includes a PDU-type (SNMP command type) field 84, request-id field 85, error-status field 86, error-index field 87, and variable bindings field 88.

The variable bindings field 88 includes multiple fields 88-1, 88-2, and so forth comprising an OID (Object Identifier) identifying management information (an object) stored in the MIB of the device, and value of the object corresponding to the OID.

An OID stored in the variable bindings field 88 is an example of target identification information identifying the management information of the process target in the management information of the device.

In this embodiment of the invention, the serial number of the selected device is written to the community field 82 of an SNMP packet 80 of this structure. In other words, in step S310, the first process request generator 14 generates an SNMP packet 80 having the serial number of the selected device selected in step S300 written to the community field 82.

In step S420, the second process request generator 22 generates a USB command adding a specific USB header 101 to the SNMP PDU (field 83) of the SNMP packet 80. The second process request generator 22 generates a separate USB command for each OID and value pair in the variable bindings field 88 of the data field 83. In the example in FIG. 4, a USB command 100 adding a USB header 101 to a data field 83 containing only field 88-1 from the variable bindings field 88, and a USB command 110 adding a USB header 101 to a data field 83 containing only field 88-2 from the variable bindings field 88, are generated.

The USB header 101 is a header that a device (USB device) locally connected to the relay manager 20 can interpret, and by adding a USB header 101, the generated command can be processed by a USB device as a type of command conforming to the USB communication standard. By executing step S420, the second process request generator 22 functions as a generator that acquires, from the first process request (SNMP packet), target identification information (OID) identifying the management information to target in the management information of the selected device, and generates a second process request (USB command) containing the OID.

In step S430 (second process request transmission step), the controller 21 (communication controller 23) sends the USB command generated in step S420 through the local communication interface 25 to the device (selected device) identified by the serial number contained in the SNMP packet received in step S400 (written to the community field 82 of the SNMP packet 80). In the example in FIG. 4, in step S430, the USB commands 100, 110 are sent to the device (selected device) identified by the serial number through the local communication interface 25. The local communication interface 25 is an example of a local communicator.

The locally connected device (such as device 40) locally connected to the relay manager 20 as the selected device then receives the USB commands (USB commands 100, 110) from the relay manager 20 through the local communication connection 70 (step S500). The selected device then responds to the USB command received in step S500 (step S510).

For example, if the PDU-type (field 84) of the USB commands 100, 110 indicates a GetRequest, the selected device reads the management information corresponding to the OID specified in the USB command 100 from the MIB of the selected device, and writes the acquired management information as the value of the OID in field 88-1 of the USB command 100. The selected device also reads the management information corresponding to the OID specified in the USB command 110 from the MIB, and writes the acquired management information as the value of the OID in field 88-2 of the USB command 110.

If the PDU-type (field 84) of the USB commands 100, 110 indicates a SetRequest, the selected device overwrites the management information in the MIB of the selected device corresponding to the OID specified in the USB command 100 with the corresponding value, and writes that the value was overwritten in field 83 of the USB command 100. The selected device also overwrites the management information in the MIB of the selected device corresponding to the OID specified in the USB command 110 with the corresponding value, and writes that the value was overwritten in field 83 of the USB command 110.

Examples of management information when the device is a printer, for example, include the remaining amount of consumables such as ink or toner, status information such as device errors and the on/off state of the device, and network settings such as the IP address of the device. The selected device returns the management information specified by the OID or a response that management information was overwritten. The USB commands 100, 110 processed on the selected device side are referred to below for convenience as USB commands 100' and 110' (see FIG. 4). The selected device sends the processed USB commands 100', 110' as the response in step S510 through the local communication connection 70 to the relay manager 20 (step S510).

On the relay manager 20 side, the controller 21, after sending the USB command to the selected device in step S430, checks continuously whether or not a response to the USB command was received through the local communication interface 25 (step S440). If a response to the USB command is received within a specific time after step S430 (that is, operation did not time out) (step S440: Yes), the controller 21 goes to step S450. However, if a response to the USB command is not received within a specific time after the USB command is sent to the selected device in step S430 (that is, operation times out) (step S440: No), the controller 21 ends the process in FIG. 3. For example, if the selected device is busy due to a firmware update process, the selected device may not be able to respond to the USB command from the relay manager 20.

Because step S460 (sending an SNMP packet from the relay manager 20 to the device manager 10) does not execute if the connection check in step S410 determines the selected device is not communicatively connected through the local communication interface 25, or if step S440 returns No, the result is the same from the device manager 10 side.

If an error occurs in the processes corresponding to the USB commands 100, 110 received in step S500, the selected device sends USB commands 100', 110' written with information related to the error to the relay manager 20 as the response in step S510. More specifically, the selected device sends USB commands 100', 110' with the error number of the error that occurred written in the error-status field 86, and the position in the variable bindings field 88 where the error occurred in the error-index field 87, to the relay manager 20 as the response in step S510.

In step S450, the controller 21 (second process request generator 22), based on the response from the selected device (the USB command after processing by the selected device), generates an SNMP packet.

For example, referring to FIG. 4, the second process request generator 22 generates an SNMP packet 80' in the format of the original SNMP packet by combining the parts of the SNMP PDU (field 83) with the USB header 101 removed from the USB commands 100', 110' after processing by the selected device, and adding the version field 81 and community field 82. Of course, the content of the value of each field 88-1, 88-2 in the variable bindings field 88 of this SNMP packet 80', the error-status field 86, and the error-index field 87, for example, are changed as appropriate to the process executed by the selected device from the content of the SNMP packet 80 received from the device manager 10 in step S400.

In step S460, the controller 21 (communication controller 23) sends, from the network communication interface 24, the SNMP packet generated in step S450 to the device manager 10 that sent the SNMP packet received in step S400.

As a result, on the device manager 10 side, the controller 11 (network communication controller 15) receives, through the network communication interface 19, the SNMP packet sent from the relay manager 20 (step S330). By reading information from the SNMP packet received in step S330, the controller 11 can monitor the selected device by, for example, acquiring the management information related to the selected device selected in step S300 (such as the ink level in a device that is a printer), or confirming that a setting in the management information of the selected device was changed. Note that if an SNMP packet from the relay manager 20 is not sent within a specific time as the response to transmission of the SNMP packet in step S320, the controller 11 determines that the selected device selected in step S300 is not connected to the relay manager 20.

This embodiment of the invention teaches a system 1 that connects, through a network 60, a device manager 10 that manages devices 30, 40, 50, and a relay manager 20 that connects to multiple devices 40, 50 through a local communication connection 70. The device manager 10 (controller 11) sends through the network 60 to the relay manager 20 a first process request (SNMP packet 80), which is a first process request according to a specific network communication protocol (SNMP) for managing targets connected to the network 60, and is a first process request including device identification information (such as a serial number) identifying a device that connects the relay manager 20 (step S320).

The relay manager 20 receives the first process request through the network 60 (step S400), acquires from the first process request target identification information identifying target management information in the management information of the device to process, generates a second process request containing the target identification information (USB commands 100, 110 containing an SNMP PDU (field 83)) (step S420), and sends the second process request through the local communication connection 70 to the device identified by the device identification information contained in the first process request (step S430).

In this configuration, the device manager 10 sends a process request (first process request) according to SNMP to the relay manager 20 when managing a locally connected device in the same way as when managing a network device (such as device 30). In this event, however, the first process request includes device identification information for a device locally connected to the relay manager 20. As a result, the relay manager 20 that receives a first process request through the network 60 can generate a process request (second process request) based on the first process request for transmission to a device locally connected to the relay manager 20, and send this second process request (USB command) through the local communication connection 70 to the device indicated by the device identification information contained in the first process request.

The relay manager 20 also converts the response to the second process request received from a device locally connected to itself to the format of an SNMP packet before sending the second process request to the device manager 10 through the network 60 (steps S450, S460). For example, the relay manager 20 receives management information corresponding to the target identification information as part of the response to the second process request from the device that sent the second process request through the local communication connection 70, and sends the received management information in the SNMP packet through the network 60 to the device manager 10.

Management of a locally connected device by the device manager 10 through the relay manager 20 includes, as described above, a process of sending a process request and acquiring management information from a locally connected device, and a process of sending a process request and causing a locally connected device to change a setting of the management information, that is, rewrite the management information.

In other words, the device manager 10 can use SNMP to manage locally connected devices. This greatly reduces the load on the device manager 10 compared with the related art whereby management of locally connected devices and network devices is handled by completely different communication control methods. Because locally connected devices and network devices are managed using different communication control methods, the types of management information that can be acquired from locally connected devices and network devices also differs. However, the method of this embodiment of the invention eliminates this problem.

In addition, the first embodiment shown in FIG. 4 enables the device manager 10 to use the community name in the SNMP packet to easily specify for the relay manager 20 the destination device of the process request.

Other examples and variations included in this embodiment of the invention are described below. Further description of elements described above and redundant elements is also omitted below.

4. Embodiment 2

Figure 5:
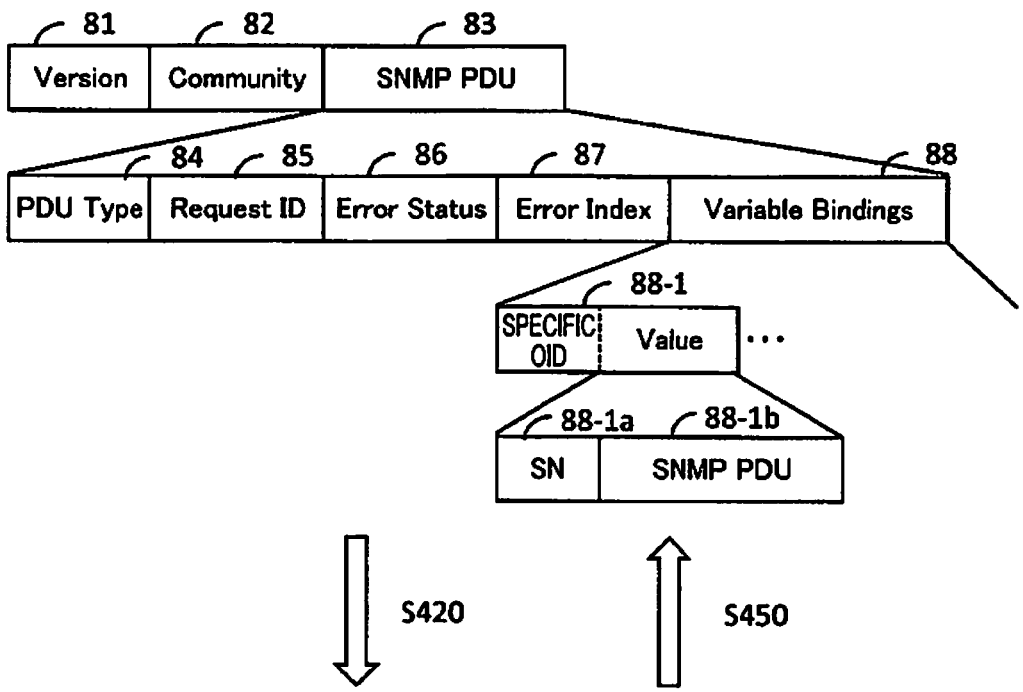
FIG. 5 shows the structure of an SNMP packet and USB command according to a second embodiment of the invention.
Figure 5:
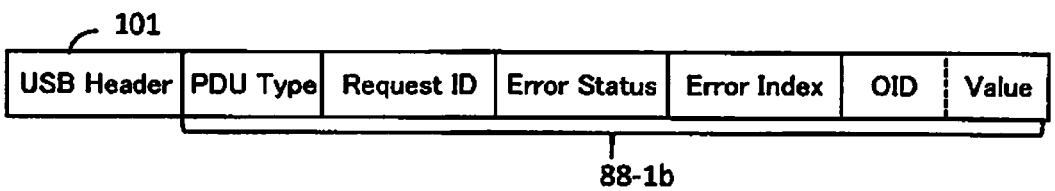

FIG. 5 illustrates the structure of an SNMP packet and USB command according to a second embodiment of the invention.

As described above, in step S310 (FIG. 3), the controller 11 (first process request generator 14) generates an SNMP packet including the serial number of the selected device selected in step S300. In this second embodiment, the first process request generator 14 generates an SNMP packet as shown in FIG. 5 (step S310), and the network communication controller 15 sends the generated SNMP packet 80 to the relay manager 20 (step S320). The SNMP packet 80 according to the second embodiment of the invention does not carry the serial number of the selected device in the community field 82, and instead adds the serial number where the value of the management information is written.

More specifically, as shown in FIG. 5, in the variable bindings field 88 of the SNMP packet 80, in each of the multiple fields where an OID and value pair are written (such as field 88-1), a specific OID is written as the OID, and in the field where the value corresponding to the specific OID is written, the serial number of the selected device (field 88-1*a*) and the SNMP PDU (field 88-1*b*) are written.

That is, in field 88-1*b*, the SNMP PDU is inserted as the substance of the process request to send to the selected device in a nested structure. The SNMP PDU inserted to field 88-1*b* is itself an SNMP command to be sent from the relay manager 20 to the selected device and including fields where the target identification information (OID) and the value of the management information corresponding to the target identification information are written in the form of a variable bindings field.

The parts of the SNMP packet 80 (FIG. 5) other than this specific OID, serial number (field 88-1*a*), and SNMP PDU (field 88-1*b*) are written in an SNMP compatible format, but only function as containers for placing the specific OID, serial number (field 88-1*a*), and SNMP PDU (field 88-1*b*).

The specific OID is not an OID for identifying management information in the MIB of a device, but is specific identification information indicating a data structure having the serial number of a selected device and the SNMP PDU inserted to the value field in the variable bindings field 88.

Because a specific OID is included in the variable bindings field 88 of the SNMP packet 80 received in step S400 in this second embodiment, the controller 21 can read the serial number from field 88-1*a* in the value field of the specific OID in step S410 (FIG. 3). As a result, the connection check can be completed for the device (selected device) corresponding to the serial number. In addition, in step S420, the controller 21 (second process request generator 22) extracts the SNMP PDU (field 88-1*b*) from the value field corresponding to the specific OID contained in the variable bindings field 88 of the SNMP packet 80, adds the USB header 101 described above to the extracted field 88-1*b*, and generates a USB command as a second process request (in the example in FIG. 5, USB command 100).

In step S430, the controller 21 (communication controller 23) sends the USB command generated in step S420 through the local communication interface 25 to the device (selected device) indicated by the serial number read from field 88-1*a* of the value field of the specific OID.

Next, in step S450, the controller 21 (second process request generator 22) generates an SNMP packet based on the response from the selected device (the USB command after processing by the selected device). In other words, referring to FIG. 5, the second process request generator 22 generates an SNMP packet 80' in the format of the original SNMP packet by returning the part of the SNMP PDU (field 88-1*b*) minus the USB header 101 from the USB command 100' after processing by the selected device to the value field of the specific OID in the variable bindings field 88. Of course, the content of the value of the OID, the error-status field, and the error-index field, for example, in the SNMP PDU (field 88-1*b*) of the variable bindings field 88 of the SNMP packet 80' according to the second embodiment of the invention (FIG. 5) are changed according to the process of the selected device from the content of the SNMP packet 80 received from the device manager 10 in step S400.

In this second embodiment of the invention shown in FIG. 5, the device manager 10 sends an SNMP packet including device identification information in a data field of the management information in the SNMP packet as a first process request. This configuration enables easily specifying for the relay manager 20 the destination device of the process request by using the value field of the management information in the SNMP packet (first process request).

Note that in the second embodiment, instead of inserting only the SNMP PDU (the command to send to the selected device from the relay manager 20 in the form of a second process request) to field 88-1 in the value field of the specific OID contained in the variable bindings field 88 of the SNMP packet 80, the complete SNMP packet including the SNMP PDU may be inserted in a nested structure.

5. Third Embodiment

Figure 6:
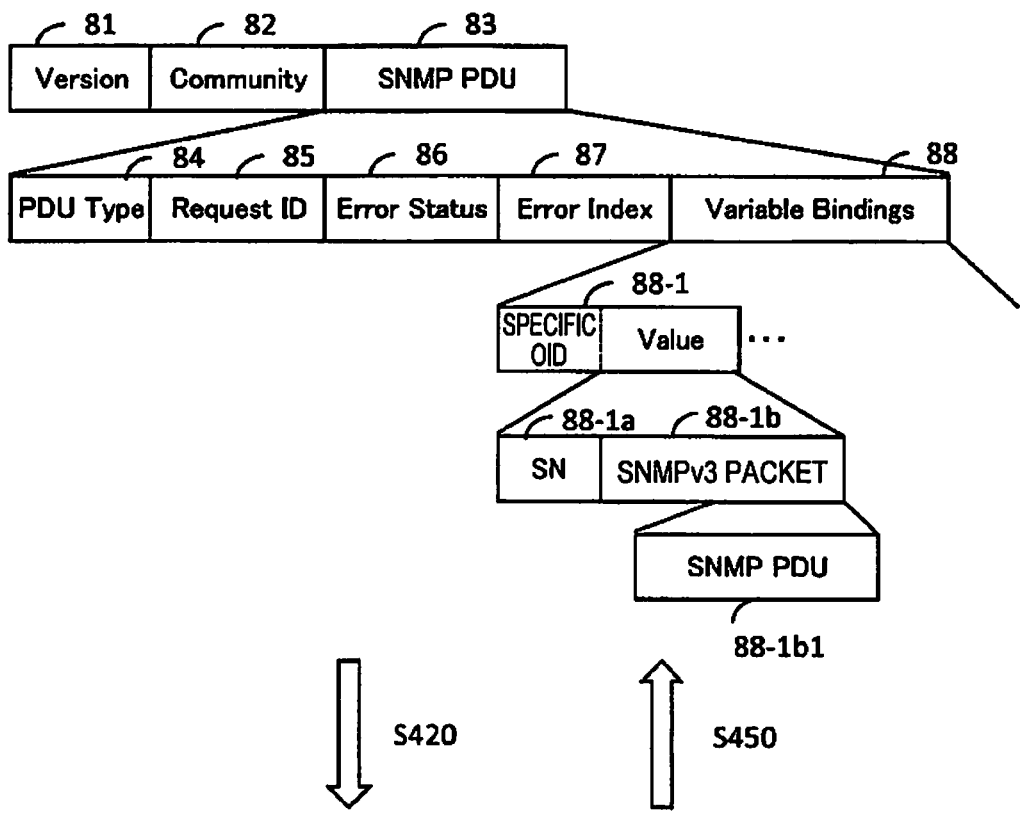
FIG. 6 shows the structure of an SNMP packet and USB command according to a third embodiment of the invention.
Figure 6:
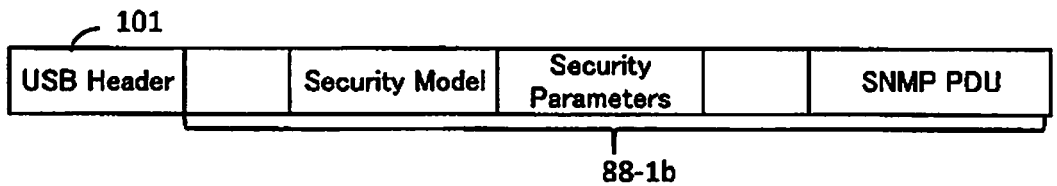

FIG. 6 illustrates the structure of an SNMP packet and USB command according to a third embodiment of the invention. The SNMP packet according to the third embodiment of the invention differs from the SNMP packet of the second embodiment shown in FIG. 5 in the data that is inserted to field 88-1*b* in the value field of the specific OID contained in the variable bindings field 88. The position where the serial number is inserted to the SNMP packet is the same in the second embodiment and the third embodiment.

In this third embodiment, a packet (SNMPv3 packet) in a format compatible with SNMP version SNMPv3 is inserted to field 88-1b. As known from the literature, an SNMPv3 packet differs from the format of SNMPv1 and SNMPv2 in not using a community name, and having security-related settings (such as security model and security parameters). An SNMPv3 packet also contains an SNMP PDU (field 88-1b1 in FIG. 6) as described above, and the SNMP PDU in a SNMPv3 packet is encrypted with a specific password when the device manager 10 generates the SNMP packet 80 (step S310 in FIG. 3).

More specifically, the encrypted SNMP PDU in the SNMPv3 packet inserted to field 88-1b is the main part of an SNMP command to be sent from the relay manager 20 to the selected device in the form of a second process request including the target identification information (OID) fields and the value field of the management information corresponding to the target identification information in the form of a variable bindings field.

An SNMP packet according to the third embodiment is a packet in a format corresponding apparently to SNMPv1 and SNMPv2, but includes in part a SNMPv3 packet formatted according to version SNMPv3. In step S420 in the third embodiment, the controller 21 (second process request generator 22) extracts the SNMPv3 packet (field 88-1b) from the value field of the specific OID contained in the variable bindings field 88 of the SNMP packet 80, adds the USB header 101 described above to the extracted SNMPv3 packet (field 88-1b), and generates a USB command (USB command 100 in FIG. 6) as a second process request.

In step S500 in the third embodiment, the selected device that received the USB command as a second process request decrypts the SNMP PDU (field 88-1b1) from the SNMPv3 packet (field 88-1b) based on the security model and security parameters set in the SNMPv3 packet (field 88-1b) included in the USB command, and a previously stored (by a user operation) password. The decrypted SNMP PDU is the substance of the process request from the device manager 10 to the selected device. As a result, the selected device, based on the decrypted SNMP PDU, responds to the USB command described above (step S510). In this event, the selected device, after writing the value specified by the OID in the decrypted SNMP PDU, for example, re-encrypts the SNMP PDU using the password, and sends a USB command 100' (FIG. 6) including a SNMPv3 packet (data field 88-1b) containing the encrypted SNMP PDU to the relay manager 20 as the response to the USB command 100 (step S510).

In step S450, the controller 21 (second process request generator 22) generates an SNMP packet based on the response from the selected device (the USB command after processing by the selected device). In other words, referring to FIG. 6, the second process request generator 22 generates an SNMP packet 80' in the format of the original SNMP packet by returning the part of the SNMPv3 packet (field 88-1b) minus the USB header 101 from the USB command 100' after processing by the selected device to the value field of the specific OID in the variable bindings field 88. Of course, the content of the value of the OID, the error-status field, and the error-index field, for example, in the SNMP PDU (field 88-1b1) of the SNMPv3 packet (field 88-1b) in the variable bindings field 88 of the SNMP packet 80' according to the third embodiment of the invention (FIG. 6) are changed according to the process of the selected device from the content of the SNMP packet 80 received from the device manager 10 in step S400.

In this third embodiment, the device manager 10 that received the SNMP packet 80' from the relay manager 20 in step S330 can acquire the required information by decrypting the SNMP PDU (field 88-1b1) in the SNMP packet 80' using the password.

A device that can receive and process a process request containing a SNMPv3 packet as described above (a USB command 100 shown in FIG. 6) is a device compatible with SNMP version SNMPv3. This third embodiment therefore supposes that in step S320 (FIG. 3) the device manager 10 sends a first process request (SNMP command) according to the version of SNMP with which the device (selected device) indicated by the device identification information (serial number) is compatible.

Figure 7:
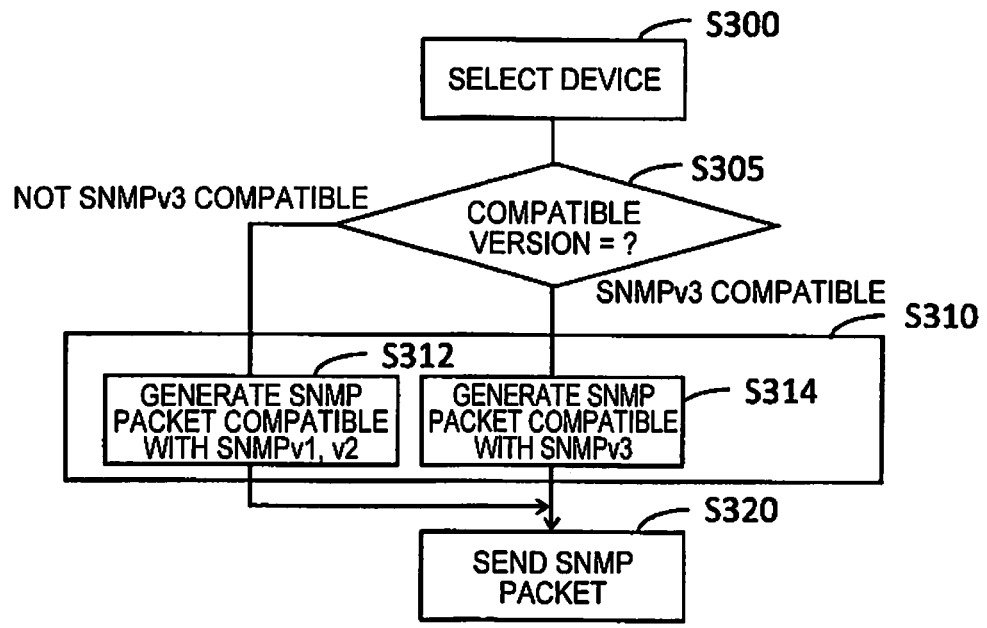
FIG. 7 is a flow chart showing a variation of steps S300 to S320.

FIG. 7 is a flow chart showing a variation of part of the device manager 10 process (steps S300 to S32) shown in FIG. 3.

After selecting a device in step S300, the controller 11 of the device manager 10 determines, in step S305, the version of SNMP the device selected in step S300 is compatible with. The controller 11 acquires basic device information for each device by the discovery process (FIG. 2) described above, and the basic device information contains the version of SNMP the device is compatible with. The controller 11 can therefore determine, based on the basic device information of each device, if the selected device is compatible with SNMP version SNMPv3 or is not compatible (is compatible with version SNMPv1 or SNMPv2).

If the selected device is not compatible with SNMP version SNMPv3 and is compatible with version SNMPv1 or SNMPv2, the controller 11 goes to step S312. If the selected device is compatible with version SNMPv3, the controller 11 goes to step S314. Both step S312 and step S314 are comparable to step S310 (FIG. 3) for generating an SNMP packet containing the serial number of the selected device.

However, in step S312, the controller 11 generates SNMP packets compatible with versions SNMPv1 and SNMPv2. More specifically, SNMP packets are generated as described in the first embodiment (FIG. 4) or the second embodiment (FIG. 5) in step S312.

In step S314, the controller 11 generates an SNMP packet compatible with version SNMPv3. More specifically, step S314 generates SNMP packets according to the third embodiment (FIG. 6). An SNMP packet according to the third embodiment includes a process request (SNMPv3 packet) according to version SNMPv3 in the SNMP PDU (field 83), and may be considered a type of SNMP packet compatible with version SNMPv3.

In step S320 after step S312, the controller 11 sends the SNMP packet generated in step S312 to the relay manager 20, and in step S320 after step S314, the controller 11 sends the SNMP packet generated in step S314 to the relay manager 20.

In the second embodiment and third embodiment, the device manager 10 inserts and sends as a first process request an SNMP command including fields storing target identification information and management information corresponding to the target identification information to a field of the management information in a first process request in an SNMP format. In other words, the device manager 10 sends a first process request with a nested structure inserting in a part of the SNMP packet 80 an SNMP command (SNMP PDU (field 88-1b in FIG. 5 or field 88-1b1 in FIG. 6) containing fields storing target identification information (OID) and values of management information corresponding to the target identification information.

The relay manager 20 generates a second process request containing the command. As a result, by encrypting the inserted portion, the security of USB commands sent as a second process request to a device locally connected to the relay manager 20 can be easily improved. More specifically, the third embodiment sends a first process request inserting a SNMPv3 packet conforming to version SNMPv3 to part of the SNMP packet 80. As a result, the process request can be sent from the device manager 10 to the selected device with the security of the substantive part of the process request to be sent to the selected device maintained.

In this embodiment of the invention, the controller 11 of the device manager 10 has a discovery device 12 that acquires by discovering through the network 60 the version of SNMP with which a device that connects to the relay manager 20 is compatible. The controller 11 of the device manager 10 then sends to the relay manager 20 (FIG. 7) a first process request (SNMP packet) that includes the device identification information (serial number) of a selected device and is formatted in the version of SNMP with which the selected device indicated by the device identification information is compatible. As a result, the device manager 10 can send a first process request appropriate to the processing capacity of the device that is locally connected to the relay manager 20 and is the destination of the process request.

Other Examples

The specific network communication protocol for managing target devices connected to the a network 60 in this embodiment of the invention is not limited to SNMP, and various protocols that may be used for network monitoring can be used.

The communication protocol used for locally connecting the relay manager 20 to devices is also not limited to USB, and various communication protocols enabling connecting devices and computers without going through a network can be used.

As described above, this embodiment of the invention provides a configuration that is a device manager configured to connect through a network to a relay manager that connects to multiple devices through a local communication path, and sends through the network to the relay manager a first process request, the first process request conforming to a specific network communication protocol for managing management targets that connect to the network, and containing device identification information identifying a device that connects to the relay manager.

This embodiment of the invention also provides a configuration that is a relay manager configured to connect to multiple devices through a local communication path, and connect through a network to a device manager that manages the devices, the relay manager receiving through the network from the device manager a first process request, the first process request conforming to a specific network communication protocol for managing management targets that connect to the network, and containing device identification information identifying a device; acquiring from the first process request target identification information identifying management information targeted for processing in the management information of the device; generating a second process request including the target identification information; and sending the second process request through the local communication path to the device indicated by the device identification information included in the first process request.

Other aspects of the invention are a program causing the device manager to execute the process described above (a device management program causing a computer to execute a process of managing devices through a network); and a program causing the relay manager to execute the process described above (a relay manager program causing a computer that connects to multiple devices through a local communication path to execute a process relaying communications for managing devices).

The invention also provides a computer-readable storage medium storing these programs.

Other aspects of the invention are methods corresponding respectively to the device manager and relay manager; and a method including these methods (a device management method of a system that connects, through a network, a device manager that manages a device, and a relay manager that connects to multiple devices through a local communication path).

The entire disclosure of Japanese Patent Application No. 2017-185802, filed Sep. 27, 2017 and No. 2018-094794, filed May 16, 2018 are expressly incorporated by reference herein.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A device management system configured to connect through a network a device manager that manages a plurality of devices, and a relay manager that connects to, through a local communication path, a plurality of first devices of the plurality of devices;

the device manager including a first network communicator configured to send to the relay manager through the network a first process request, the first process request conforming to a specific network communication protocol used to manage management targets that are different from the plurality of first devices and that connect to the network without through the relay manager, and containing device identification information identifying one of the plurality of first devices that connects to the relay manager, the specific network communication protocol being Simple Network Management Protocol; and the relay manager including
a second network communicator configured to receive the first process request through the network,
a generator configured to acquire from the first process request target identification information identifying management information to process in the management information of the one of the plurality of first devices, and generate a second process request that contains the target identification information and does not conform to the specific network communication protocol, and
a local communicator configured to send the second process request through the local communication path to the one of the plurality of first devices indicated by the device identification information contained in the first process request.

2. The device management system described in claim 1, wherein:

the local communicator receives through the local communication path from the one of the plurality of first devices, which is a destination device of the second process request, the management information identified by the target identification information; and the second network communicator sends the management information the local communicator received through the network to the device manager.

3. The device management system described in claim 1, wherein:

the first network communicator sends as the first process request a communication packet having the device identification information written in a community name field in a communication packet conforming to the network communication protocol.

4. The device management system described in claim 1, wherein:

the first network communicator sends as the first process request the communication packet having the device identification information written in a management information field in a communication packet conforming to the network communication protocol.

5. The device management system described in claim 4, wherein:

the first network communicator sends as the first process request the communication packet having inserted to the management information field a command conforming to the network communication protocol and including the target identification information and a management information field corresponding to the target identification information; and the generator generates the second process request including the command.

6. The device management system described in claim 1, wherein:

the device manager has a discovery device configured to acquire, by searching through the network, the version of the network communication protocol with which the one of the plurality of first devices that connects to the relay manager is compatible; and the first network communicator sends the first process request including the device identification information according to the network communication protocol of the version with which the one of the plurality of first devices indicated by the device identification information is compatible.

7. The device management system described in claim 1, wherein:

the first network communicator sends a process request according to the network communication protocol through the network to a second device of the plurality of devices that connects to the network, and receives through the network a response to the process request from the second device.

8. The device management system described in claim 1, wherein:

the relay manager identifies multiple local communication paths by connection identification information; and the device manager sends a request including the connection identification information through the network to the relay manager, and receives through the network from the relay manager the device identification information of the one of the plurality of first devices connected to the local communication path identified by the specified connection identification information.

9. A relay manager configured to connect to a plurality of first devices through a local communication path, and connect to a device manager that manages a plurality of devices that include the plurality of first devices, wherein:

the relay manager receives through the network from the device manager a first process request, the first process request conforming to a specific network communication protocol used to manage management targets that are different from the plurality of first devices and that connect to the network without through the relay manager, and containing device identification information identifying one of the plurality of first devices that connects to the relay manager, and acquires from the first process request target identification information identifying management information to process in the management information of the one of the plurality of first devices, generates a second process request that contains the target identification information and does not conform to the specific network communication protocol, and send the second process request through the local communication path to the one of the plurality of first devices indicated by the device identification information contained in the first process request, and the specific network communication protocol is Simple Network Management Protocol.

10. A non-transitory computer recording medium recording a relay manager program causing a computer that connects to a plurality of first devices through a local communication path to execute a process relaying communications for managing the plurality of first devices, the non-transitory computer recording medium causing executing:

a function of receiving through a network from a device manager a first process request, the first process request conforming to a specific network communication protocol used to manage management targets that are different from the plurality of first devices and that connect to the network without through the relay manager, and containing device identification information identifying one of the plurality of first devices, the network communication protocol being Simple Network Management Protocol;

a function of acquiring from the first process request target identification information identifying management information to process in management information of the one of the plurality of first devices, and generating a second process request that contains the target identification information and does not conform to the specific network communication protocol; and a function of sending the second process request through the local communication path to the one of the plurality of first devices indicated by the device identification information contained in the first process request.

* * * * *